Patented Nov. 29, 1938

2,138,799

UNITED STATES PATENT OFFICE 2,138,799

MINERAL FUSION PRODUCT AND PROCESS OF MAKING SAME

Charles R. Walker, South Braintree, Mass., assignor to Abrasive Products, Inc., South Braintree, Mass., a corporation of Massachusetts No Drawing. Application February 10, 1936, Serial No. 63,222

8 Claims. (Cl. 51—280)

My invention relates to a mineral fusion product and more particularly to a fusion product of garnet or the like and other materials, which product is adapted, in one aspect, for use in crushed form as an abrasive; and to a method of forming such product.

In use as an abrasive, my product is characterized by its conchoidal fracture; it is also a hard, uniform, tough, smooth, glass-like composition, all of which characteristics particularly adapt it for such use. In other aspects it may be used as a hard, durable glaze for ceramics or for reflecting surfaces and the like or may well find a variety of uses for ornamental purposes, as a stone or synthetic jewel of the class of onyx, jasper and the like.

A valuable feature of my invention resides in the fact that one of its constituents may be mineral dust which is otherwise unfit for use as an abrasive. The product may therefore be a salvage product from waste material, thus being not only economical but also providing a very practical method of converting waste.

In the preparation of natural minerals, such as garnet, for abrasive purposes, after the crushing operation, a certain amount thereof is so pulverized as to be practically useless either as an abrasive or otherwise, and often such dust is discarded as useless. In accordance with my invention, when other silica material and a proper flux are added to this dust, a fusion of such mixture produces a very desirable composition which may be made to possess practically all of the desirable characteristics of an abrasive.

My product therefore comprises a fusion product of a silicate, such as garnet, other silica material, such as other alumina silicates, and a flux, such as boron compounds.

Such a product possesses the attribute of a conchoidal fracture, which, in abrasive use, insures a sharp cutting edge at all times, both when initially used and after subsequent fractures are caused during use, thus providing a very much improved cutting power over the natural minerals which are not possessed of this characteristic. In addition the product may be made to possess a hardness and toughness equal to or even greater than that of the natural mineral while possessing a smoother surface which prevents the abrasive from becoming clogged with the abraded material. The composition also comprises a compact structure which is free from cracks and cleavage planes often present in natural mineral which cause the mineral to break up in use; and, due to the fusion, the product is uniform throughout its mass, a characteristic seldom found in natural minerals.

As a method of making my preferred product, I set forth, as an example only, the following process in which garnet dust is used. Powdered garnet, 20 parts by weight; borax, 10 parts by weight; china clay or kaolin, 1 part by weight. These materials in powdered form, are thoroughly mixed and then subjected to heat at a fusing temperature, the borax acting as a flux. I have found that a temperature of approximately 2200° F. is necessary for these particular proportions. The mixture is left at this temperature until fusion is complete, one hour being sufficient in this particular case at the above given temperature. The mass when thoroughly fused may then be poured out (into molds, if desired) and cooled, either by immersion or otherwise, and if for use as an abrasive may be crushed and graded.

Before crushing, the product thus formed is a black, glass-like, smooth, compact, tough substance, homogeneous and uniform throughout, possesses the characteristic of a conchoidal fracture, has a hardness in the order of 7½ to 8½ (Mohs' scale) and is non-crystalline in structure. As pointed out, this substance may have a variety of uses other than for abrasive purposes.

Boric acid may be used in place of the borax, although the boric acid does not give as smooth a product. Likewise, other fluxes, especially other boron compounds, may be used either with those mentioned or alone, but those fluxes which are also oxidizing agents, such as sodium or potassium nitrates, are less satisfactory when iron is present, as is the case when garnet is used.

The hydrated nature of the primary clay, kaolin or china clay, makes it particularly efficacious in a fusion process, but other silica-containing material, including silica itself, may be used either alone or in combination with the kaolin; but, if used, I prefer other non-alkali silica compounds. These ingredients all tend to give hardness to the product and the proportions may be varied accordingly.

Likewise the amount of flux may be varied according to the smoothness desired, although it is advisable to use substantially the proportions indicated.

My product may be obtained by using either the mineral dust as above described, or mineral in grain form, the fusing action providing a homogeneous and uniform product in either case, although it will be readily seen that if the mineral is pulverized to the degree of a dust, the ingredients may be more thoroughly intermingled prior to the fusing.

I claim:

1. A method of salvaging garnet dust comprising heating said garnet dust with other silica material in the presence of a flux to secure a homogeneous fusion thereof and cooling the fused mass.

2. A process comprising mixing garnet dust with kaolin and a flux in the proportions substantially of 20 parts of garnet to 1 part of kaolin to 10 parts of flux, and fusing said mixture.

3. A homogeneous, tough, non-crystalline glass-like fusion product of garnet, kaolin and a boron compound.

4. An abrasive comprising a non-crystalline fusion product of garnet, another silica-containing material and a flux.

5. An abrasive comprising a fusion product of garnet, kaolin and a flux.

6. A homogeneous, tough, non-crystalline, glass-like fusion product of garnet and another silica-containing material said product being characterized by its conchoidal fracture, and possessing a hardness in the order of 8.

7. A homongenous, tough, non-crystalling, glass-like fusion product of garnet, kaolin and a flux, said product being characterized by its conchoidal fracture and possessing a hardness greater than that of said garnet prior to fusion.

8. A homogeneous, tough, non-crystalline, glass-like fusion product of an alumina-iron-silica material, a non-alkali silica-containing material and a flux, said product possessing a hardness greater than that of either of said materials prior to fusion and having a substantial alumina and a substantial iron content.

CHARLES R. WALKER.